US010817916B2

(12) United States Patent
Sahlstrom et al.

(10) Patent No.: US 10,817,916 B2
(45) Date of Patent: Oct. 27, 2020

(54) CLIENT-SELECTABLE POWER SOURCE OPTIONS FOR NETWORK-ACCESSIBLE SERVICE UNITS

(71) Applicant: Amazon Technologies, Inc., Reno, NV (US)

(72) Inventors: Nathanael David Sahlstrom, Seattle, WA (US); James R. Hamilton, Seattle, WA (US); Ian John Wrightson, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1226 days.

(21) Appl. No.: 14/028,376

(22) Filed: Sep. 16, 2013

(65) Prior Publication Data

US 2015/0081374 A1 Mar. 19, 2015

(51) Int. Cl.
*G06Q 30/04* (2012.01)
*G06Q 10/06* (2012.01)
*G06Q 50/06* (2012.01)

(52) U.S. Cl.
CPC .......... *G06Q 30/04* (2013.01); *G06Q 10/063* (2013.01); *G06Q 10/06315* (2013.01); *G06Q 50/06* (2013.01)

(58) Field of Classification Search
CPC ............ G06Q 50/06; G06Q 10/0631; G06Q 10/06315; G06Q 30/04
See application file for complete search history.

(56) References Cited

U.S. PATENT DOCUMENTS

| 7,742,830 B1 | 6/2010 | Botes |
| 7,962,769 B1 | 6/2011 | Patel et al. |
| 2008/0189565 A1 | 8/2008 | Sheng et al. |

(Continued)

FOREIGN PATENT DOCUMENTS

| JP | 2001184406 | 7/2001 |
| JP | 2011197767 | 10/2011 |

(Continued)

OTHER PUBLICATIONS

Le, K. T. (2013). Managing energy usage and cost through load distribution in multi-data-center services (Order No. 3558690). Available from ProQuest Dissertations and Theses Professional. (1346016442). (Year: 2013).*

(Continued)

*Primary Examiner* — Michael P Harrington
(74) *Attorney, Agent, or Firm* — Robert C. Kowert; Kowert, Hood, Munyon, Rankin & Goetzel, P.C.

(57) ABSTRACT

Methods and apparatus for client-selectable power source options for network-accessible service units are described. A programmatic interface is implemented to enable clients of a service to select, from among a plurality of power source categories including a renewable category and a non-renewable category, a power source category to be used for a service unit. Based on inputs received via the interface, the respective amounts of power to be obtained from renewable and non-renewable categories during a time period may be estimated. A verification operation comparing the estimated amounts to the amount of power that is actually obtained from the different sources may be performed.

20 Claims, 9 Drawing Sheets

(56) References Cited

U.S. PATENT DOCUMENTS

| | | | |
|---|---|---|---|
| 2009/0119233 A1* | 5/2009 | Dunagan | G06Q 10/04 705/412 |
| 2009/0216910 A1 | 8/2009 | Duchesneau | |
| 2009/0235097 A1 | 9/2009 | Hamilton et al. | |
| 2009/0260014 A1* | 10/2009 | Cameron | G06F 9/505 718/104 |
| 2009/0265568 A1* | 10/2009 | Jackson | G06F 1/3203 713/320 |
| 2010/0024445 A1 | 2/2010 | Cichanowicz | |
| 2010/0037225 A1* | 2/2010 | Doyle | G06F 1/3203 718/102 |
| 2010/0174643 A1 | 7/2010 | Schaefer et al. | |
| 2010/0191998 A1* | 7/2010 | Moore | G06F 1/3203 713/340 |
| 2010/0217651 A1 | 8/2010 | Crabtree et al. | |
| 2010/0228861 A1* | 9/2010 | Arsovski | G06F 9/5027 709/226 |
| 2010/0298998 A1 | 11/2010 | Hamilton, II et al. | |
| 2010/0332860 A1 | 12/2010 | Trantham et al. | |
| 2011/0077795 A1* | 3/2011 | VanGilder | G06F 1/206 700/300 |
| 2011/0131431 A1* | 6/2011 | Akers | G06F 9/5027 713/320 |
| 2011/0145621 A1 | 6/2011 | Albano et al. | |
| 2011/0246987 A1 | 10/2011 | Diwakar et al. | |
| 2011/0316337 A1 | 12/2011 | Pelio et al. | |
| 2012/0103395 A1 | 5/2012 | Prengler et al. | |
| 2012/0130554 A1 | 5/2012 | Jain et al. | |
| 2012/0173912 A1 | 7/2012 | Albano et al. | |
| 2012/0179824 A1* | 7/2012 | Jackson | G06F 9/5027 709/226 |
| 2012/0240113 A1* | 9/2012 | Hur | G06F 9/45558 718/1 |
| 2012/0284730 A1* | 11/2012 | DeCusatis | G06F 9/5094 718/104 |
| 2012/0303174 A1 | 11/2012 | Szu et al. | |
| 2013/0037254 A1 | 2/2013 | Carlson et al. | |
| 2014/0052506 A1* | 2/2014 | Lee | G06Q 30/02 705/14.1 |

FOREIGN PATENT DOCUMENTS

| | | |
|---|---|---|
| JP | 2012515973 | 7/2012 |
| WO | 03023675 | 3/2003 |
| WO | 2012074743 | 6/2012 |

OTHER PUBLICATIONS

Villegas, D. (2012). Interoperable resource brokering with policy-based provisioning and job allocation (Order No. 3554220). Available from ProQuest Dissertations and Theses Professional. (1315954688). (Year: 2012).*

Le, T. (2012). Towards sustainable cloud computing reducing electricity cost and carbon footprint for cloud data centers through geographical and temporal shifting of workloads (Order No. MR86539). Available from ProQuest Dissertations and Theses Professional. (1356682726). (Year: 2012).*

International Search Report and Written Opinion from PCT/US2014/055913, dated Dec. 22, 2014, Amazon Technologies, Inc., pp. 1-17.

U.S. Appl. No. 13/907,073, filed May 31, 2013, Nachiketh Rao Potlapally et al.

Extended European Search Report from PCT/US2014055913, dated Feb. 10, 2017, Amazon Technologies, Inc., pp. 1-10.

Office Action from Japanese Patent Application No. 2016-542878, dated Feb. 14, 2017 (English translation and Japanese version), pp. 1-6.

* cited by examiner

400

Compute Instance Selection Page https://<website>.com/selectComputeInstances

Dear John Doe, Welcome to the compute instance selection page! ← 403

Please select the types and numbers of compute instances you wish to acquire. We now offer "green" instances powered by renewable energy sources.

Your account ID: 124541656 ← 407

Availability container: US-East-AC1 (click to change) ← 410

412

| Instance type | Allocation mode | Instance count | Pricing |
|---|---|---|---|
| Standard-large | On-demand | 1 | $X.xx/hour |
| Green-large | On-demand | 1 | $Y.yy/hour |
| Standard-medium | On-demand | 1 | $K.ll/hour |
| Green-medium | On-demand | 1 | $L.mm/hour |
| Standard-small | On-demand | 1 | $P.pp/hour |
| Green-small | On-demand | 1 | $Q.qq/hour |

Click here for additional instance choices ← 415

Submit instance request ← 417

*FIG. 4*

CLIENT-SELECTABLE POWER SOURCE OPTIONS FOR NETWORK-ACCESSIBLE SERVICE UNITS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As more and more applications have been migrated to "cloud" configurations over recent years, the sizes of the physical and virtual resource fleets have grown dramatically. Many operators of provider networks that implement network-accessible services may manage numerous data centers distributed across multiple geographic regions, with each data center including thousands of physical virtualization hosts and thousands of virtual machines on the physical hosts. Some large client organizations may utilize hundreds or thousands of virtual machines for their application sets. Substantial amounts of electrical power may be consumed on behalf of such large clients at the provider network data centers, both for the computing systems and for other infrastructure elements such as cooling systems. At least some clients are becoming more concerned about environmental consequences of using the network-accessible services, such as the extent to which non-renewable energy sources that may be contributing to greenhouse gas levels are used for meeting their computing needs.

BRIEF DESCRIPTION OF DRAWINGS

FIG. 4 illustrates an example of a web-based interface that may be used by clients of a network-accessible service to select service units categorized by type of power source, according to at least some embodiments.

Figure 1:
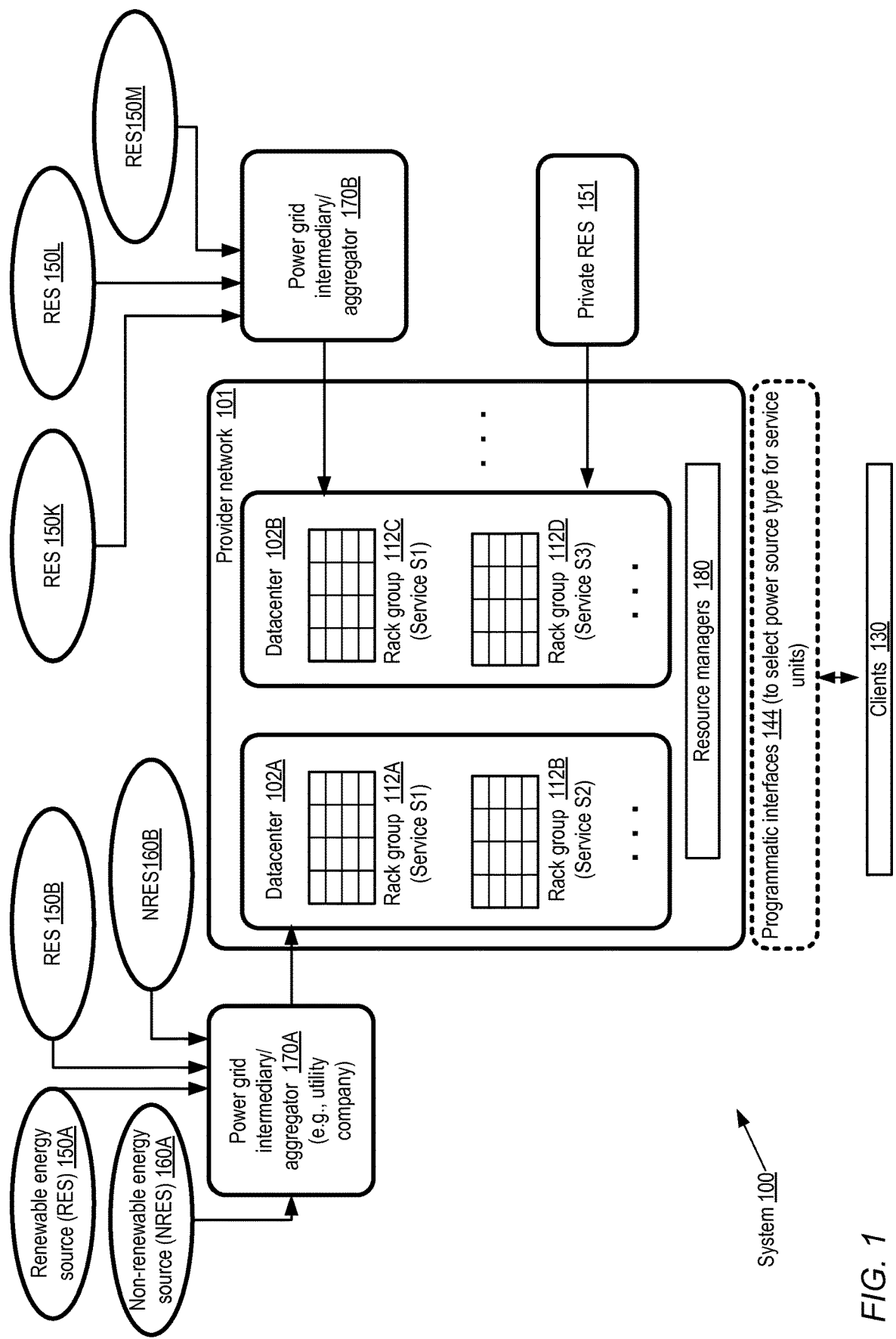
FIG. 1 illustrates an example of a system in which clients of one or more network-accessible services are enabled to programmatically select categories of power sources to be used for service units, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for supporting client-selectable power source options for service units of network-accessible services implemented at a provider network are described. For example, in one embodiment, a client of a virtualized computing service may wish to utilize "green" or renewable energy sources for at least a subset of the client's compute instances. In such an embodiment, the virtualized computing service may provide interfaces enabling clients to choose any desired combination of "green instances" and standard instances (where the standard instances need not necessarily be powered using renewable energy source). In at least some embodiments, pricing policies for the different types of service units may also be indicated programmatically to the clients. Based on various factors including client input received via the interfaces, the service may estimate the demands for power from different types of sources. Contractual agreements may be entered into with power providers, with a goal of obtaining sufficient power from a set of renewable energy sources during a given time period to match the demand for green instances during that time period. The service may also provide feedback to the client (e.g., in the form of invoice contents broken down by power source category) summarizing the client's power category choices over time. In some embodiments auditing functionality may be supported, enabling the client to request third-party verifications regarding the mix of power sources used for the service. Similar approaches may also or instead be taken to support flexible power source choices for other types of services of the provider network in some embodiments, such as storage services (e.g., by allowing clients to use "green volumes" versus standard volumes), database services (e.g., "green database instances" versus standard database instances), networking-related services (e.g., "green data transfers" versus standard data transfers), and the like. By allowing clients to make informed choices regarding power source categories at fairly fine levels of service granularity, the provider network may enable environmentally-conscious clients to make meaningful and financially sustainable changes to their energy usage footprints. In addition, in at least some embodiments in which a provider network includes a plurality of data centers, a mismatch may sometimes be detected between the demand for a given power source category at a data center and the supply of that category of power to that data center over some time period. In such a scenario, in accordance with a power demand rebalancing policy, in one embodiment a set of service units may be transferred from one data center to another (e.g., the service units may be implemented using resources at a different data center than was originally intended) in an effort to more closely match supply and demand for different power source categories.

Networks set up by an entity such as a company or a public sector organization to provide one or more network-accessible services (such as various types of cloud-based computing, storage or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network.

According to at least one embodiment, an operator of the provider network may obtain electrical power for a given data center from one or more types of power sources, often via an intermediary or a set of intermediaries such as utility companies that set up hubs for power distribution, regional transmission operators (RTOs), and the like. A wide variety of power supplying facilities may be available in general, including for example several that may be categorized as generating power based on renewable sources (such as hydroelectric, solar, wind, geothermal, tidal, or biomass sources), and several that may be categorized as generating power based on non-renewable sources (e.g. coal, petroleum, or natural gas). It may thus be possible to categorize the power sources available into groups based on various criteria—e.g., whether the underlying resources are renewable or not, the carbon-dioxide emissions levels of the power sources (e.g., a nuclear power plant may be considered a low-carbon source but not a renewable energy source), whether the power source generates toxic byproducts or not, whether the power source is local or involves imports from other countries, and so on. In at least some implementations, because of the nature of the power transmission grid and distribution techniques, it may not always be possible for a consumer of power to determine the exact power source at which a given kilowatt-hour or megawatt-hour of power was generated, but it may be possible for intermediaries such as RTOs and/or utilities to provide a breakdown of the power sources used at a facility during some time period. In some embodiments, the provider network itself may own or lease power generation equipment or facilities, such as one or more wind turbine farms or large-scale solar panel arrays. For data centers or portions of data centers powered by such private or "off-grid" sources, it may be easier to identify the power source more precisely. For some extremely large data centers, it may at least at times be difficult (or prohibitively expensive) to exclusively power the entire data center with renewable energy, depending on factors such as the current pricing of different types of power, the location of the data center relative to renewable energy-based power generating facilities, and so on.

In response to increasing demands for more environmentally-aware computing, a provider network operator may categorize power sources for data centers into categories (e.g., into renewable versus non-renewable energy categories, or into low-carbon-footprint versus high-carbon-footprint categories). Arrangements may be made with the power grid intermediaries to obtain verifiable and/or auditable information indicating the types of power sources used for a given data center or collection of data centers over specified time periods in some embodiments. According to at least one embodiment, at least one of the services implemented at the provider network may implement programmatic interfaces (e.g., web-pages or web-based consoles, application programming interfaces or APIs, command-line tools, or graphical user interfaces of various kinds) enabling a client of the service to select, from among a plurality of power source categories including a renewable energy category and a non-renewable energy category, a particular power source category to be used for resources associated with one or more service units. Different service units may be defined for different services—for example, for virtualized computing service, the service units may comprise virtual machines or compute instances in some embodiments, or compute-hours or compute-minutes in other embodiments. For a database service, service units may include database instances, tables, transactions, or queries in various embodiments. For storage-related services, the service units may include volumes, virtual disks, or other storage space aggregations. In at least some embodiments, a resource manager comprising one or more hardware and/or software components of the service may be responsible for implementing the programmatic interfaces, and/or for initiating actions based on input received via the interfaces. The programmatic interfaces may indicate different pricing policies for different power sources in some implementations— e.g., a compute instance with performance capability P1 for which a renewable energy source category is selected may have a different billing rate per compute-hour than a compute instance with that same performance capability P1 for which a non-renewable energy source category is selected.

It is noted that in at least some embodiments, the service may make a best effort to utilize the power source mix selected by various clients for a set of service units, but may not be in a position to guarantee that the selected power sources are used. For example, power output fluctuations from renewable energy sources such as wind farms may occur, leading to insufficient renewable power being delivered to meet the client demand. In addition, infrastructure failures within or external to the provider network may occur, leading to a different mix of actual power sources used than was planned.

Having enabled programmatic selection of power sources, in some embodiments the service may estimate, based at least in part on inputs received via the one or more programmatic interfaces from one or more clients, the demand for different categories of power over some time frame. For example, a first amount of power to be obtained from electrical power sources of the renewable energy category during a time period (such as a 3-month contractual period) and a second amount of power to be obtained from electrical power sources of the non-renewable energy category during the time period may be estimated. In various embodiments, the resource manager may utilize a model (e.g., an analytical or simulation model) to estimate the power demand for the different categories. The model may rely on metrics obtained from a variety of sources, such as power usage measurements collected from various computing infrastructure elements such as servers, compute appliances, storage devices, network devices, racks and the like, as well as from elements of the power distribution and cooling infrastructure such as single-rack or multiple-rack PDUs (power distribution units), air-conditioning units, and so on. In addition to power usage metrics, in at least one embodiment the resource manager may collect application-related metrics (e.g., data indicating the kinds of applications being run, or the rates at which various kinds of operations are being performed) from various resources in the data center, which may then be correlated with the power usage metrics to obtain a workload-based characterization of power consumption that can be used for the model. The estimates of the power demand for the different categories may be provided to the utility companies or to the power supply facilities (e.g., local/ private power suppliers) in some embodiments, e.g., to indicate the amounts of power that should be provided to the data center or data centers over the time period associated with the estimates. In at least some embodiments, contractual agreements may be made with the different suppliers in accordance with the respective expected demands. In at least some embodiments, the estimated amounts may be provided to the suppliers and/or intermediaries programmatically, e.g., using APIs, email messages, or other programmatic means of communication.

In some embodiments, a resource manager may be configured to verify the extent to which the actual power supplied during some time period corresponds to the estimates and/or requested amounts. In one embodiment, for example, the power supplied to different portions of the data center (e.g., to different rooms of a multi-room data center) may be metered separately, and different portions may be fed from respective utility lines corresponding to different power source categories. In such an embodiment, the information collected by the different meters may be used for such verification. In other embodiments, communications with the utilities and/or the RTOs may be used for the verification. In at least one embodiment, power source verification need not be initiated by the service or performed at all within the provider network; instead, for example, the grid intermediaries may be relied upon to match the actual power supplied with the estimated demands for the different source categories, and to notify the service if and when the actual source mix diverges from the demand mix.

According to one embodiment, invoices provided to clients for their use of a service may include separate line items for service units associated with each of the different power source categories. In this way, a client may be able to see how many units of each service they consumed, categorized by power source type. In some embodiments, clients may also be allowed to submit requests for audit reports or records generated by third parties (i.e., parties other than the provider network operator, such as RTOs or utility companies) indicating the fraction and/or amount of the power that was consumed for one or more services from various types of power sources. In one embodiment, the service may also provide certificates of renewable-energy usage (e.g., "carbon footprint reduction" certificates) to a client, based for example on the selection by the particular client of power sources of the renewable energy category for one or more service units during the time period. In one implementation, evidence of such certificates may be displayed at the clients' web sites, for example, e.g., in the form of logos or images generated and transmitted from the provider network.

Example System Environment

FIG. 1 illustrates an example of a system 100 in which clients of one or more network-accessible services are enabled to programmatically select categories of power sources to be used for service units, according to at least some embodiments. As shown, system 100 comprises a provider network 101 with a plurality of data centers 102, such as data centers 102A and 102B. A number of different network-accessible services may be implemented at the data centers 102 for use by clients 130; some services may be implemented using resources located at a plurality of data centers, while others may be implemented entirely from within one data center. In the depicted embodiment, electrical power may be obtained for the data centers 102 from a variety of sources and/or through a variety of intermediaries. Two broad categories of power sources from which the data centers obtain power via intermediaries 170 (e.g., 170A and 170B, which may include utility companies, regional transmission operators, or other power aggregators and distributors) are shown in FIG. 1: renewable energy sources (RESs) 150 (such as RES 150A, 150B, 150K, 150L, and 150M), and non-renewable energy sources (NRESs) 160 (such as NRES 160A and 160B). In addition, in the depicted embodiment, private renewable energy source 151 (e.g., a wind farm or a set of solar power arrays) that does not have an associated intermediary, may also be available for one or more data centers 102. Some private renewable energy sources may be owned, managed, or leased by the provider network operator in various embodiments. In some embodiments, private non-renewable energy sources may also be used. Private power generation facilities may be termed "off-grid" facilities in some embodiments.

Various types of RESs and NRESs may be used in different embodiments. For example, in some embodiments RESs 150 may include any combination of (a) a solar power generation facility, (b) a wind power generation facility, (c) a geothermal power generation facility, (d) a tidal power generation facility, (e) a hydroelectric power generation facility, or (f) a biomass power generation facility, while NRESs 160 may include fossil-fuel-dependent facilities such as coal, oil or natural gas facilities. In some embodiments nuclear power facilities may also be categorized as NRESs. In one embodiment, power sources may be categorized using other criteria—e.g., based on carbon emission ("carbon-footprint") levels, on byproduct toxicity levels, or on country of origin. Power grid intermediaries 170, such as utility companies, may be responsible for aggregating power from a variety of sources and ensuring that a stable supply of power is available for the data centers. The intermediaries 170, such as 170A and 170B, may also be responsible for keeping track of the sources of power provided to the provider network data centers 102 in at least some embodiments, e.g., for a given month, a utility company or RTO may be able to provide an indication of how much power obtained from NRESs was provided a data center 102A, and how much power obtained from RESs was provided to that same data center 102A. Some RTOs or utilities may be able to implement "tags" that can be used for identifying power sources, for example. In some cases, power sources may be tracked at a finer granularity on the delivery side, e.g., an intermediary 170 or a collection of intermediaries 170 may be able to record exactly how much power was delivered to each data center during a given time period from each RES 150 or each NRES 160. The intermediaries 170 and/or the managers/owners of the private renewable energy sources 151 may typically enter contractual agreements with the provider network operator to supply agreed-upon amounts of power during specified time periods, e.g., from a mix of different power source categories that may also be indicated in the contractual agreements. In some embodiments, it may be possible to power an entire data center using just one power source category—e.g., data center 102B in FIG. 1 is shown as receiving power only from renewable sources. A given intermediary 170 may aggregate and distribute power from only one power source category in some embodiments—e.g., intermediary 170B only provides power from RESs in FIG. 1.

In the depicted embodiment, each data center 102 comprises respective groups of racks, such as rack groups 112A and 112B at data center 102A, and rack groups 112C and 112D at data center 102B. Each rack group may comprise one or more racks populated with a respective number of computing devices of various types, such as compute servers, storage devices, networking devices, and the like, that may be used for various network-accessible services. A variety of different services may be implemented at the provider network in different embodiments, including for example (a) a virtual computing service, (b) a storage service, (c) a database service, (d) a search service, (e) a workflow service, (f) a messaging service, (g) an email service, (h) a security appliance service, (i) a transcoding service (e.g., for transcoding videos), (j) an identity management service, (k) an online marketplace service, or (l) a network configuration service. In some embodiments, entire racks or rack groups may be designated for use by a single service: e.g., rack groups 112A and 112C are used for service S1 in the depicted example, while rack group 112B is used for service S2 and rack group 112D is used for service S3. In other embodiments a given server, device, rack or rack group 112 may be used for a combination of services. Inventory management tools at the data centers may be configured to keep track of the computing equipment, including for example the physical locations of the various devices and the racks themselves, as well as the services with which each of the devices are associated. In at least some embodiments, the power delivery infrastructure of the data centers 102 may be organized in a manner such that it is possible to determine the sources of power being used for different parts of a data center—e.g., a data center may comprise a plurality of rooms with separate power lines and/or power distribution units that can be independently controlled. Such a decentralized power infrastructure may be implemented for a variety of purposes, e.g., for failure isolation purposes, or to reduce overall power consumption by adjusting the power supplied to various portions of the data center based on demand, and the decentralized power infrastructure may also be usable to distinguish power source categories in some embodiments.

According to at least some embodiments, the provider network 102 may include one or more resource managers 180 responsible for allocating or assigning various resources to clients 130 of the network-accessible services, for implementing power demand rebalancing across data centers when appropriate, and for various other administrative functions of the services. In some cases, each service may have its own resource manager 180 that allocates various service resources to clients, while in other cases, a single resource manager 180 may be responsible for allocating resources for a plurality of services. Each network-accessible service may have a respective set of service units defined for billing/pricing purposes in the depicted embodiment, and resources may be allocated in accordance with the service units. Service units in various embodiment may include, for example (a) a compute instance with a specified performance capability (in the case of a virtualized computing service), (b) a storage object of a specified size (for storage-related services), (c) a number of database transactions (for a database service), (d) a specified number of bytes transferred via a network (for networking-related services), or (e) some number of hardware and/or software servers associated with the service. In some embodiments, the service unit definitions may also include a temporal component, e.g., service units for the computing service may be defined in CPU hours of computation using a given instance type. Clients may be able to request or reserve various combinations of service units in different embodiments, e.g., X units of service S1, and Y units of service S2 may be allocated to a client in a given time period in some embodiments. To provide each service unit, some combination of physical resources of the provider network (e.g., CPUs or cores of various computing devices, and/or storage space at various storage devices) may be used, for which corresponding power source categories may be identifiable, at least to some acceptable level of approximation.

In some embodiments, a set of programmatic interfaces 144 may be implemented by the resource managers 180 (or by other components of the network-accessible services) to enable power source-related interactions with clients 130, e.g., to enable clients to specify the types of power sources desired for different service units of one or more of the services, to determine the pricing policies applicable for service units associated with different power source categories, to view invoices showing power source categories used by the clients, and so on. According to one such embodiment, a client may be able to select from among different power source categories for the resources used for at least some of the service units that the client wishes to acquire during a forthcoming time period. For example, in the case of a virtual computing service, clients may be able to select whether they want to obtain a "green" compute instance, for which the service may attempt to obtain power exclusively from RESs 150, or a "standard" compute instance, for which at least some power may be obtained from NRESs 160.

The resource managers 180 may be configured to estimate, based at least in part on inputs received via the programmatic interfaces from one or more clients, the amounts of power to be obtained from various power source categories. In addition to client input, various other sources such as power-related metrics collected from the data centers (such as the power consumed per rack or per rack group) may also be used to generate the estimates in some embodiments, as described below in further detail with respect to FIG. 3. In addition, the number of service units that are implemented at each rack for different types of services may also be used as input for the estimate generation in at least some embodiments. A first amount of power to be obtained from electrical power sources of the renewable energy category during a time period may be estimated, for example, and a second amount of power to be obtained from electrical power sources of the non-renewable energy category during the time period may be estimated. The estimates may be communicated (e.g., in the form of contractual agreements, or via other interfaces) with the power providers, such as intermediaries 170 and/or the operators of the private power sources such as 151. The power providers may be responsible for complying with the estimates, e.g., for making sure that the desired amounts of power are obtained from each category. In at least some embodiments, the resource managers, and/or other devices within the provider network, may be capable of verifying the power source mix, e.g., by communicating with the intermediaries 170 or with the operators of private power sources. In at least some embodiments, mismatches may arise between the amounts of power for which contractual supply agreements have been made at a given data center for some time period T based on the estimates, and the actual demand for the various types of power—for example, more clients may wish to sign up for renewable power than was initially anticipated. In some such embodiments, it may be possible for the resource manager to rebalance demand by, for example, moving or transferring some workload from one data center to another. Further details on how such demand rebalancing policies may be implemented in various embodiments are provided below.

Clients 130 may be provided feedback regarding the power source categories used in several ways in different embodiments. In some embodiments, the invoices provided to clients may comprise respective line items for different power source categories—e.g., a client may be informed in an invoice that they used X "green" service units and Y standard service units, or that K percent of their service units were associated with the NRESs 150. In at least one embodiment, clients may be able to request audits of the energy usage of the provider network—e.g., clients may be provided audit records generated by third parties such as RTOs and/or utility companies that can confirm the power source categories used by one or more services. In one embodiment, clients may be provided with certifications of renewable-energy usage upon request. Such certifications may include, for example, a statement indicating the fraction of the client's service units for which the client requested renewable energy sources. In some embodiments, a programmatic indication of the certification (such as a logo that can be incorporated into the client's own web site) may also be provided from the provider network.

Resource Manager Components

Figure 2:
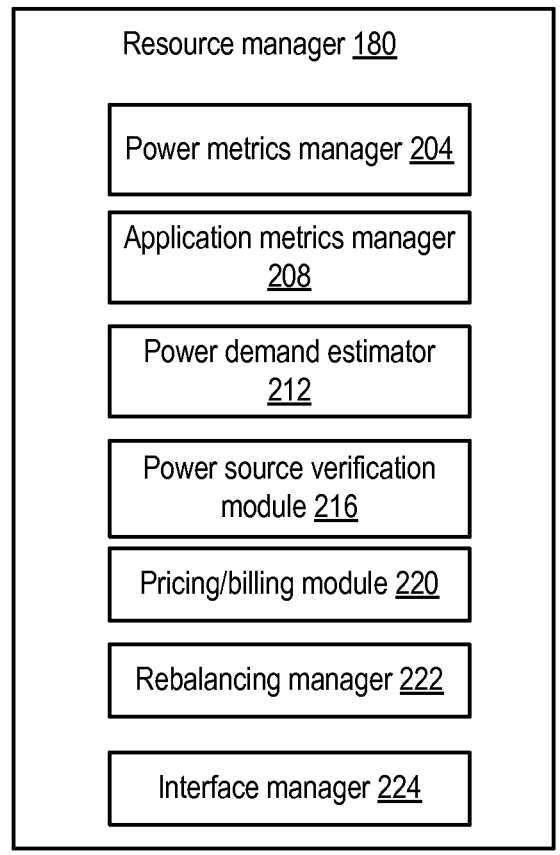
FIG. 2 illustrates example components of a resource manager configured to support service unit selection on the basis of power source categories, according to at least some embodiments.

FIG. 2 illustrates example components of a resource manager 180 configured to support service unit selection on the basis of power source categories, according to at least some embodiments. As shown, the resource manager 180 may comprise a power metrics manager 204, an application metrics manager 208, a power demand estimator 212, a power source verification module 216, a pricing/billing module 220, and an interface manager 224 in the depicted embodiment. Each of the components of the power manager may be implemented using some combination of hardware and/or software elements in a centralized or distributed architecture in various embodiments. It is noted that the resource managers 180 may include a number of other components associated with other functions, and that only examples of power source-related components are shown in FIG. 2.

The interface manager 224 may be responsible for implementing programmatic interfaces used by clients 130 for power source-related interactions of the types described above, e.g., for obtaining power-related pricing information, for specifying the desired power source categories for various service units, for obtaining invoices that show a power source category breakdown, and/or for auditing or certifications. In addition, in at least some embodiments, the interface manager 224 may also implement other programmatic interfaces that may be used to obtain power usage metrics from various data center components, and/or for obtaining workload characteristics that can be correlated with the power usage metrics to help generate estimates of power demand by category.

Figure 3:
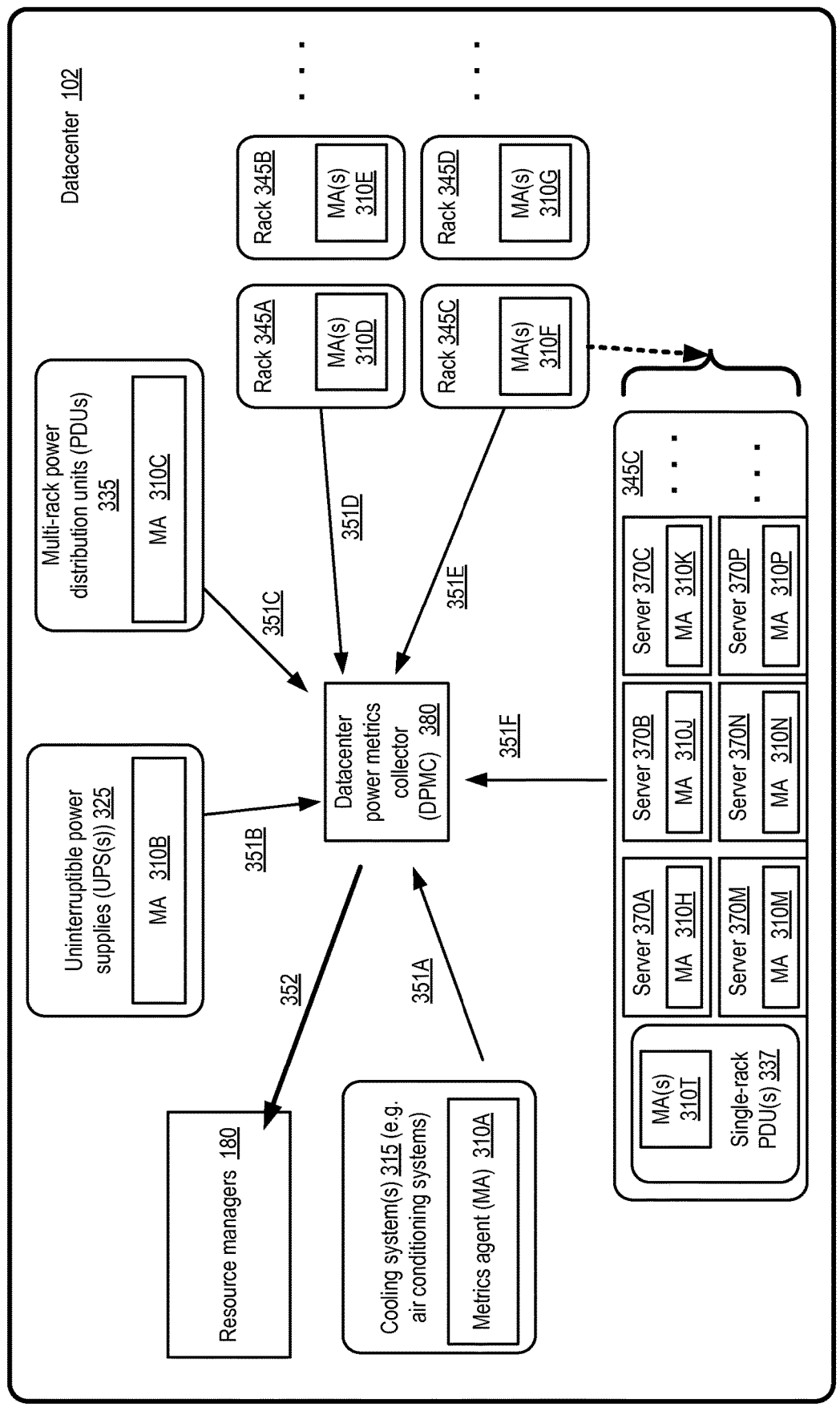
FIG. 3 illustrates a metrics collector configured to obtain power-related metrics from a plurality of agents within a data center, according to at least some embodiments.

Power metrics manager 204 may be configured to aggregate power usage metrics associated with various services, e.g., obtained periodically from one or more datacenter power metrics collectors (DPMCs), as described below in further detail with respect to FIG. 3. DPMCs may be able to provide information regarding the average power consumed per rack in a data center, for example. Application metrics manager 208 may collect workload-related information, e.g., details on which applications were running at which resources associated with various services during a given time period, and/or metrics regarding the rates at which various operations of those services were completed. For example, with respect to a database service being implemented at a collection of database appliances in one embodiment, the power metrics manager 204 may determine that X kilowatts of power were consumed during time period T1, while the applications metrics manager 208 may determine that a non-relational database instance of size Y GB was running during T1, and that Z queries per second were completed on average during T1. In some embodiments and for some types of services, the number of service units per rack may be obtained from configuration management components of the service (e.g., information about how many compute instances are set up within each server of a given rack may be provided by configuration modules of a virtualized computing service).

In the depicted embodiment, the information collected by the application metrics manager 208 and the power metrics manager 204 from a variety of different sources, together with client service units requests received via interface manager 224, may be fed into a model (e.g., a simulation model or an analytical model) maintained by power demand estimator 212. In some implementations, for example, fairly straightforward spreadsheet-based models may be used, while in other embodiments, more complex modeling tools may be employed. The power demand estimator 212 may generate estimates for the respective amounts of power to be obtained from different power source categories. For example, based on the client requests and the metrics collected from the data center, the power demand estimator 212 may estimate that that N1 megawatts of power from renewable sources may be needed at the data center over a particular 3-month period, and N2 megawatts of power from non-renewable sources may be needed. The estimates may be communicated to the appropriate power supplying entities, such as utilities or RTOs, in some embodiments, e.g., during contract negotiations.

In at least some embodiments, the price per unit of power that the provider network operator has to pay may differ from one source to another. In some cases, non-renewable energy sources may be less expensive that some types of renewable energy sources during a given time period, for example. A pricing/billing module 220 may be responsible for determining, based on current prices, anticipated pricing trends, and/or the information obtained by the application metrics manager 208 and the power metrics manager 204, respective billing amounts that clients should be charged for selecting various types of service units corresponding to the different power source categories. The pricing policies determined by the pricing/billing manager component may be communicated to clients via the programmatic interfaces implemented by the interface manager in at least some embodiments.

Rebalancing manager 222 may be responsible for implementing a power demand rebalancing policy in at least some embodiments in which a provider network has a plurality of data centers. For at least some data centers, the rebalancing manager 222 may determine a respective power supply mix metric for some time period, indicating the amounts of power that are going to be obtained for each of the data centers from various categories of sources (e.g., renewable versus non-renewable categories). The supply mix metric may, for example, be obtained based on the contracts that have been established for the following three-month period in one implementation. The contracts in turn may have been based on earlier-generated estimates (derived from earlier-submitted client requests) that were communicated to power supplying entities such as utility companies. The contracts may thus have been put into effect some time in advance of the actual consumption of the power, and in some cases the demand may have changed since the contracts were made effective. An actual or near-real-time power demand mix for each data center may also be generated, e.g., for some subset of the time period, e.g., based on analysis of near-term trends in the requests received from clients for various types of service units categorized by power source. If an analysis of the power demand mixes and the power supply mixes indicates that there may be mismatch at a given data center between supply and demand for a particular category of power during some period, the rebalancing manager may be able to transfer service units across data centers in at least some embodiments, in an effort to achieve a better balance between demand and supply for various power source categories.

It is noted that in various embodiments, not all the power-related components illustrated in FIG. 2 may be implemented within a given resource manager 180, while additional components may be implemented in other embodiments.

Power Metrics Collection

In at least some embodiments, information regarding power consumption may be collected from a variety of sources within a data center 102, and aggregated to help generate power demand estimates and appropriate pricing policies. FIG. 3 illustrates a datacenter power metrics collector (DPMC) 380 configured to obtain power-related metrics from a plurality of agents within a data center 102, according to at least some embodiments. As indicated by the arrows 351 (e.g., 351A, 351B, 351C, 351D, 351E, and 351F), the DPMC may be capable of collecting metrics programmatically from a variety of agents incorporated within different parts of the data center. For example, in the depicted embodiment, respective metrics agents (MAs) 310 may be instantiated at individual servers 370 (e.g. MAs 310H, 310J, 310K, 310M, 310N, and 310P at servers 370A, 370B, 370C. 370M, 370N and 370P respectively) located within a given rack 345C. In addition, metrics agents may also be incorporated within other infrastructure components, such as MAs 310A in the cooling systems, MAs 310T in single-rack power distribution units (PDUs), MAs 310B at uninterruptible power supplies 325, MAs 310C at multi-rack PDUs, and MAs 310D, 310E, 310F and 310G at racks 345A, 345B, 345C and 345D.

The various metrics agents 310 may communicate programmatically with the DPMC 380 in the programmatic environment, providing various types of information including, for example temperature measurements, measurements of the actual amount of power consumed during a given time interval, and/or workload-related information in the case of the agents located at servers 370. The DPMC 380 may be configured to perform a variety of functions in different embodiments, such as preemptive modifications of power levels to avert failures that might result from overheating, application migrations from one rack to another to reduce power consumption levels, and so on. Although the DPMC is shown as a single entity in FIG. 3, in at least some embodiments the functionality of the DPMC may be performed by a plurality of hardware and/or software components. In the depicted embodiment, the DPMC 380 may be configured to provide at least a subset of the data collected from the agents 310 to one or more resource managers 180, as indicated by arrow 352. The data transferred to the resource managers 180 by one or more DPMCs 380 of the provider network may be aggregated and analyzed by the resource managers 180, e.g., to determine per-rack power consumption and per service-unit power consumption, and may be used to generate power demand estimates. The measurements of power consumed by the cooling infrastructure components 315 may be used in at least some embodiments to determine the power usage effectiveness (PUE) of a data center 102, e.g., by the DPMC and/or the resource managers. PUE may be defined as the ratio of the total power consumed in the data center, to the power consumed for computing or information technology purposes (e.g., at the servers 370). The PUE may thus represent the non-computing-related power overhead associated with the services being provided in the data center, and may be used in generating the power demand estimates by the resource managers 180. In some embodiments, at least some of the devices at the data center consume power even when they are shut off. This type of power usage, which is sometimes referred to as "parasitic power", may also be captured by the DPMC and/or the resource manager in such embodiments, and may be incorporated in the PUE calculations. In some implementations, various metrics may be communicated directly to the resource manager 180 by the metrics agents, instead of or in addition to transmitting the metrics to a DPMC.

Interfaces Used for Power Source Category Interactions

As indicated above, various programmatic interfaces may be implemented to support client selection of power source categories in different embodiments. FIG. 4 illustrates an example of a web-based interface that may be used by clients of a network-accessible service to select service units categorized by type of power source, according to at least some embodiments. In the depicted example, an interface allowing clients to select compute instances of a virtualized computing service is shown; similar interfaces may be implemented for service units of other types of services may also be implemented in various embodiments. The example interface of FIG. 4 includes web page 400, with a message area 403 and a number of entries and form fields that the client may populate. As shown, the message area 403 may indicate to the client (e.g., via a statement similar to "We now support 'green' instances powered by renewable energy sources") that clients are being offered a variety of options regarding the power sources used on their behalf by the service.

In some embodiments, the provider network may be organized into a plurality of availability containers, each comprising portions of one or more data centers. Availability containers may be engineered such that failures occurring within a given availability container (e.g., power failures, security breaches, or other infrastructure failures) are almost always prevented from affecting operations at other availability containers. Thus, different availability containers may have independent failure profiles (e.g., with very little correlation between failures with other availability containers) in such embodiments. The client may be allowed to select the availability container in which a given compute instance is to be set up, using field 410 in the depicted embodiment. The account identifier of the client may be displayed via field 407 of the interface.

In the depicted example interface, clients may select some number of "standard" and/or "green" compute instances of different performance capabilities, as indicated in region 413 of web page 400. Available instance types include large, medium or small standard instances, and large, medium and small green instances. The green instances may be targeted to be powered by renewable energy sources in the depicted embodiment, while the standard instances may be targeted to be powered by at least some non-renewable sources. Different prices may be displayed per instance for the different instance types, e.g., in accordance with respective pricing policies set up for instances of the different power source categories. Clients may also be able to select the allocation mode (e.g., whether an instance is to be reserved for a long time period, or acquired on demand) and the number of instances they wish to acquire. A list of additional instance type choices may be accessible via button 415 in the depicted embodiment. The request for the desired number of instances of each type may be submitted by clicking on button 417. In other embodiments, the interface for selecting instance types may differ from that shown in FIG. 4, e.g., different types of information may be indicated for each instance type. Programmatic interfaces other than web-based interfaces, such as APIs, command-line tools, or GUIs, may be used in at least some embodiments to convey similar information regarding service unit choices and pricing for the virtual computing service or for other services, and/or to receive client-submitted requests for service units associated with different power source categories.

Figure 5:
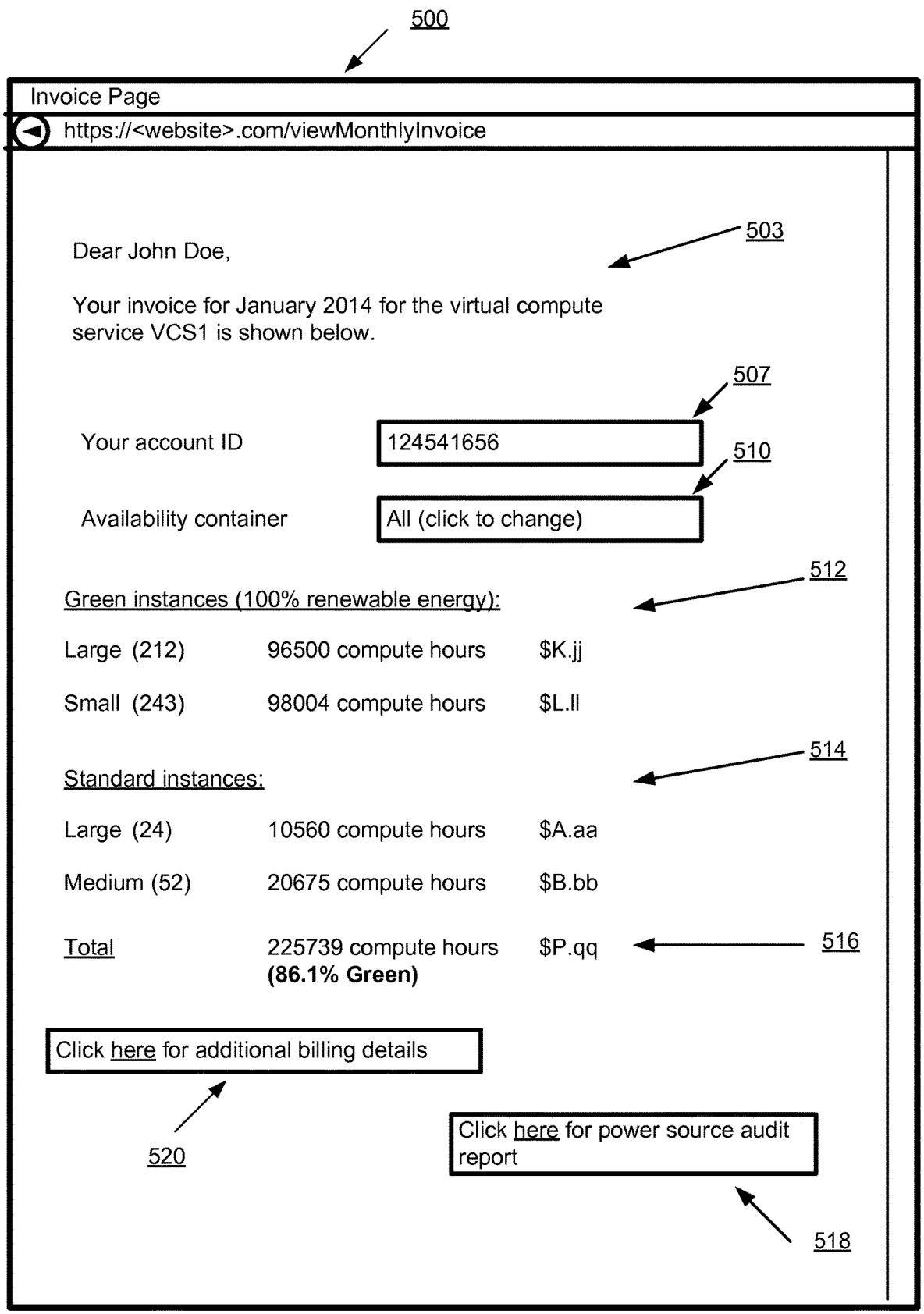
FIG. 5 illustrates an example of a web-based interface that may be used by clients of a network-accessible service to view invoice information categorized by type of power source, according to at least some embodiments

FIG. 5 illustrates an example of a web-based interface that may be used by clients of a network-accessible service to view invoice information categorized by type of power source, according to at least some embodiments. A simplified invoice for a virtualized computing service is shown in the example, although similar invoices that include line items based on power source categories may be provided for other network-accessible services as well in various embodiments. As shown, the interface may include a web page 500 that includes a message area 503 indicating the time period covered by the invoice, and lists of compute instances used by the client with account identifier 507 within the indicated availability container or containers (element 510) during the time period.

In region 512, line item entries for green instances (e.g., instances for which the client had indicated a preference for renewable energy sources) are shown, arranged by instance size. In region 514, entries for standard instances (e.g., instances for which no particular power source preference had been indicated) are shown. In the depicted example, the number of instances of each type that the client used in the billing period, together with a measure of the number of compute hours utilized and the billing amounts for the instances, are indicated. The total invoice amount is indicated in region 516. An indication of the percentage of compute hours that were "green" is also shown in entry 516. Additional details of the line items may be obtained by clicking on the link 520. In addition, in the depicted example, by clicking on the link shown in entry 518 the client may be able to request audit records from third parties (e.g., utility companies and/or RTOs) that indicate the power source mix used by the provider network during the billing period. Various details of the invoice interface may differ in some embodiments from thee example illustrated in FIG. 5. Programmatic interfaces other than web-based interfaces, such as APIs, command-line tools, or GUIs, may be used in at least some embodiments to convey similar information regarding invoice line items.

Methods for Supporting Client-Selectable Power Source Options

Figure 6:
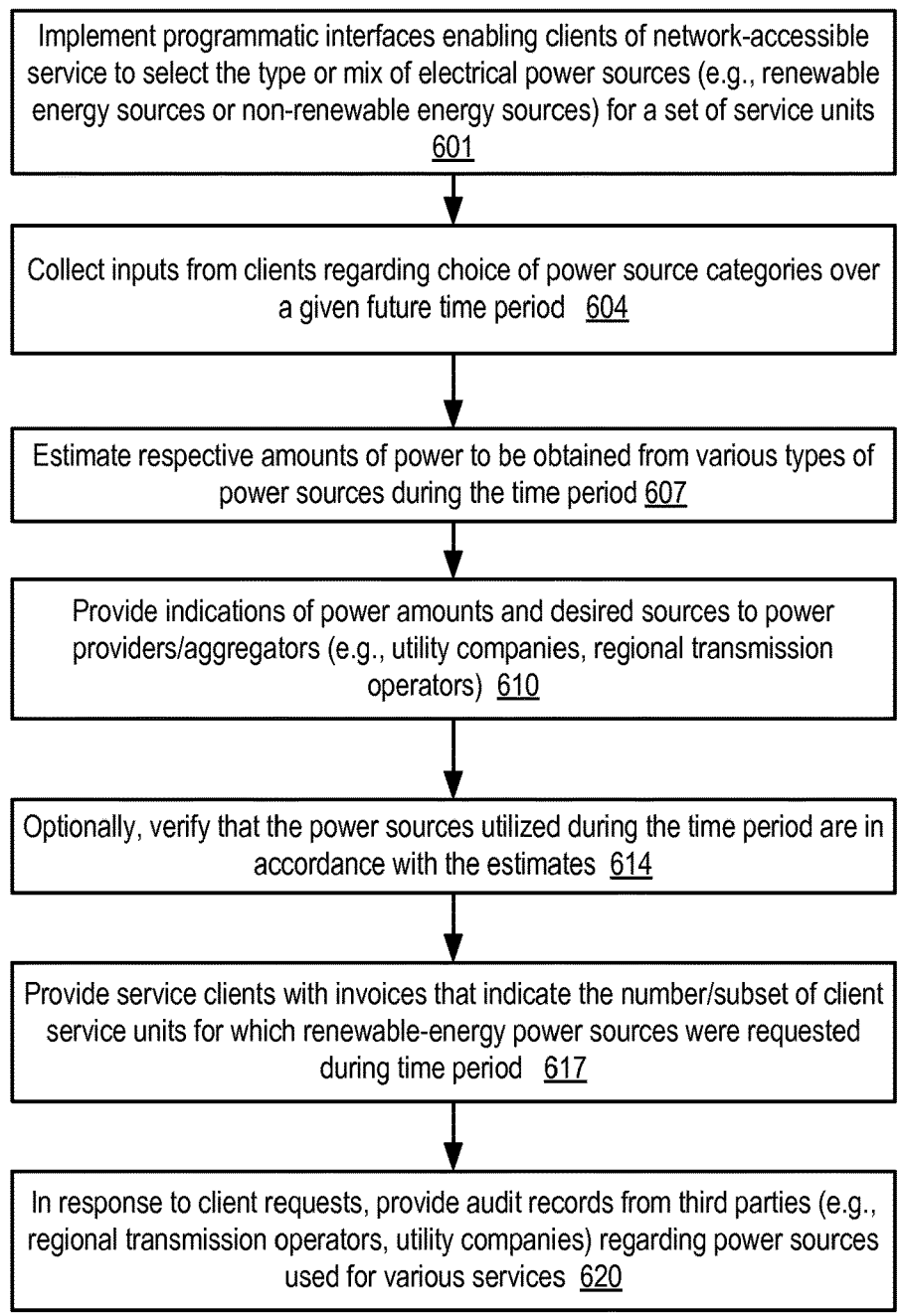
FIG. 6 is a flow diagram illustrating aspects of operations that may be performed to enable clients of a network-accessible service to select service units based on power source categories, according to at least some embodiments.

FIG. 6 is a flow diagram illustrating aspects of operations that may be performed to enable clients of a network-accessible service to select service units based on power source categories, according to at least some embodiments. As shown in element 601, one or more programmatic interfaces (such as web pages, APIs, GUIs, and/or command-line tools) may be implemented to enable clients to indicate preferred power source categories (such as renewable energy sources or non-renewable energy sources) for resources used to implement service units on behalf of the clients. Inputs provided by a plurality of clients via the interface(s) for power source category choices to be used during a time period may be collected (element 604).

Based at least in part on the collected client preferences, and/or on a variety of power-related and workload-relate metrics collected from one or more data centers, the respective amounts of power to be obtained from different categories of power sources during a time period (e.g., a month, or several months, depending on contract terms) may be estimated (element 607). Indications of the demand estimates for different power source categories may be provided to power suppliers/aggregators/intermediaries such as utility companies or RTOs in the depicted embodiment (element 610). In implementations where off-grid or locally managed private power sources (such as wind farms, hydropower plants, or solar cell arrays) are available for at least some data centers, operators of such power sources may also be provided with respective estimates of power requirements.

In at least some embodiments, depending for example on the extent of instrumentation and visibility available into power sources, the amounts of power that are obtained during the time period from the different categories of sources may optionally be verified—that is, the actual mix of power delivered may be compared to the estimates used for requesting power (element 614). In some embodiments, one or more data centers, or parts of data centers, may be powered exclusively using renewable energy sources or exclusively using non-renewable energy sources, which may make such verification easier. It is noted that depending on the infrastructure being used, it may not always be feasible to verify that any given service unit was necessarily been powered using source X or source Y, although aggregate amounts of power obtained from different power sources for a collection of service units may be obtained.

As shown in element 617, clients may be provided with invoices indicating the numbers (or ratios) of their billable service units for which renewable energy sources were requested in the depicted embodiment. For a virtualized computing service, for example, the number of "green" compute instances allocated to the client, and/or the number of compute hours utilized from "green" instances during a billing period may be shown. The invoice information may help clients obtain an overview of their environmental footprint, and may be helpful in determining service unit choices in the future in view of the client's environmental goals. In at least some embodiments, clients may also be able to request and obtain audit records from third parties such as utilities and/or regional transmission operators regarding the power sources used by one or more services or data centers of the provider network (element 620).

Figure 7:
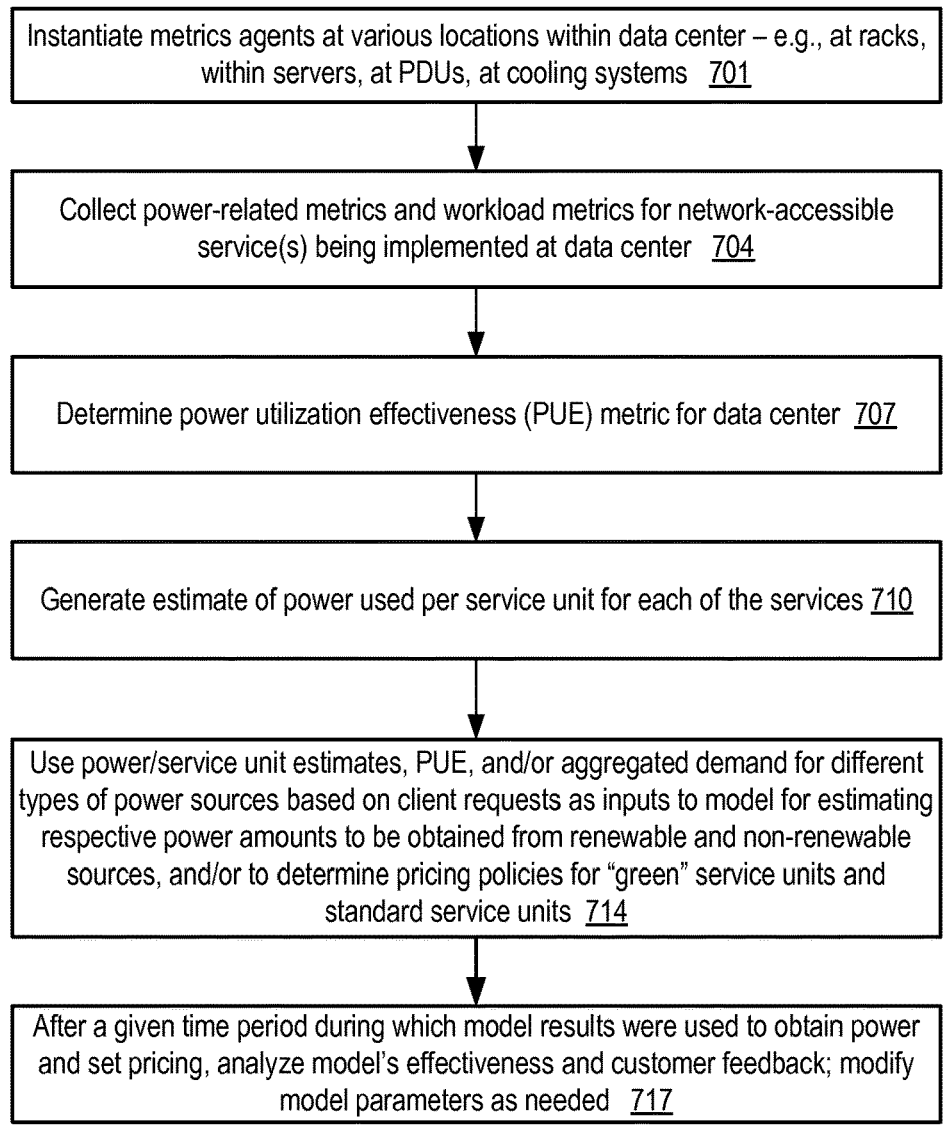
FIG. 7 is a flow diagram illustrating aspects of operations that may be performed at a provider network to determine the amounts of power to be obtained from one or more categories of power sources during a time period, according to at least some embodiments.

As described earlier, the power demands for various categories of power sources may have to be estimated in at least some embodiments. FIG. 7 is a flow diagram illustrating aspects of operations that may be performed at a provider network to determine the amounts of power to be obtained from one or more categories of power sources during a time period, according to at least some embodiments. As shown in element 701, a number of metrics agents may be instantiated at various locations within provider network data centers, e.g., at servers, racks, PDUs, cooling/air-conditioning components, and the like. Different types of agents may be used for different measured entities—e.g., some metrics agents may include analog sensors and associated firmware or software, others may include executable processes running within conventional operating systems at servers, and so on. A set of power-related metrics and workload-related metrics may be collected with the help of the agents (element 704). A power usage effectiveness (PUE) metric, indicative of the power overhead associated with non-computing-related elements of the data center infrastructure such as cooling units may be determined (element 707).

Using a combination of the metrics obtained or derived from the agents, and/or configuration information such as the number of service units configured per rack for at least some services, an estimate of the power used per service unit may be determined (element 710). Such estimates may be generated for each different service unit for those services that support different sizes of service units—e.g., for a virtualized computing service that allows clients to choose from among small, medium and large compute instances, the average power consumed for each of the three sizes of compute instances may be estimated. A model (such as a spreadsheet model, or a more sophisticated analytical model or simulation model) may then be used to estimate the respective amount of power to be requested from different sources during a time period (element 713). In one embodiment, the model may include among its inputs the PUEs for the various data centers involved, the aggregated demand for different types of service units based on client input, and/or the per-service-unit power estimates. In some implementations, the PUE may already have been factored in to the per-service-unit estimates, and need not be provided as an input to the model. In addition to providing estimates of power demand for each of one or more categories of power sources, the model may also be helpful in at least some embodiments to determine pricing policies for various service units based on the associated power sources. Over time, the model's effectiveness (e.g., as measured by how accurate the model predictions or estimates are), as well as client feedback regarding the pricing and/or available choices of power sources may be monitored in some embodiments, and various parameters of the model may be modified as needed to improve the effectiveness and the customer satisfaction levels (element 716).

Figure 8:
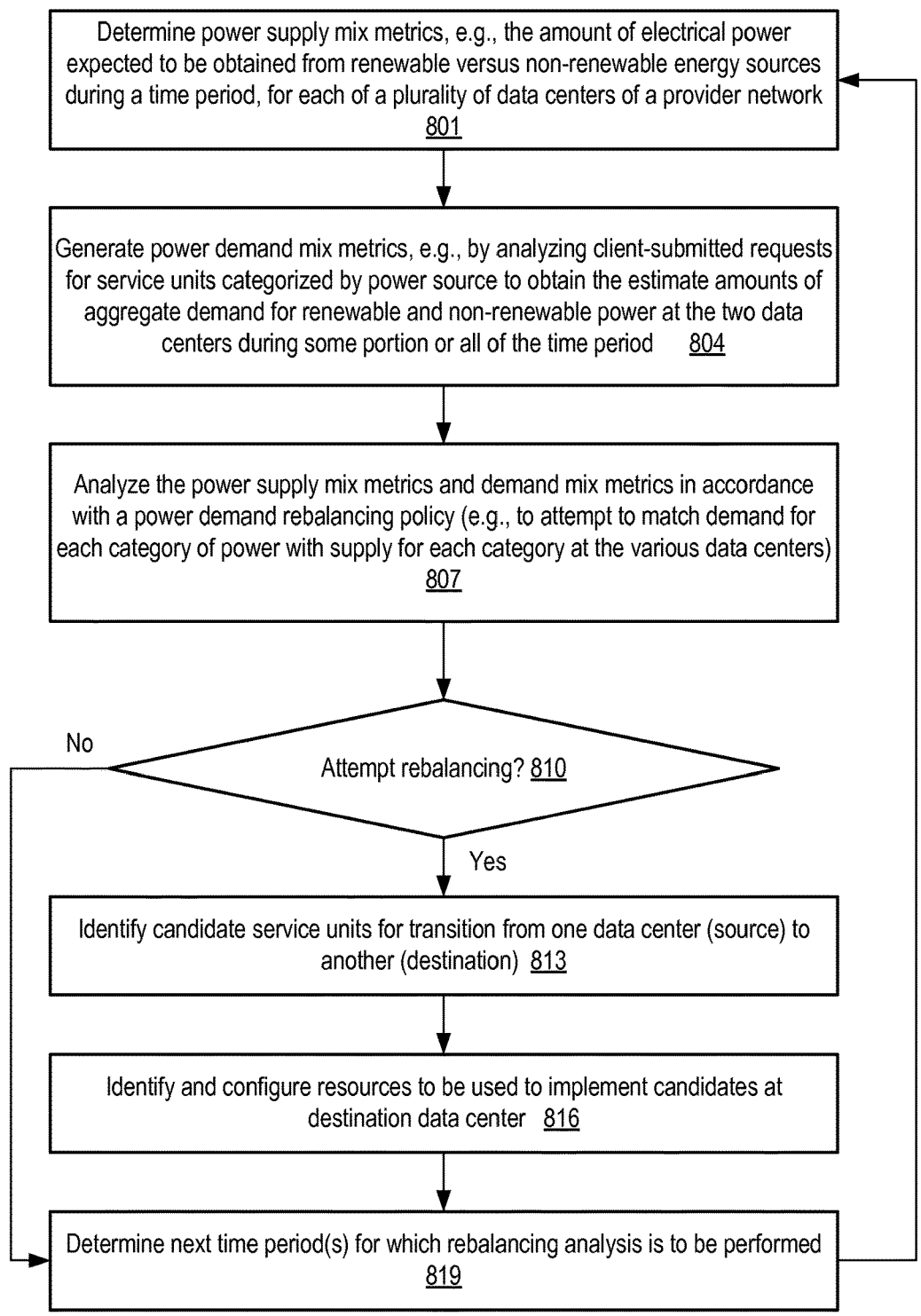
FIG. 8 is a flow diagram illustrating aspects of operations that may be performed at a provider network to balance supply and demand for different categories of power sources by transferring workloads from one data center to another, according to at least some embodiments.

FIG. 8 is a flow diagram illustrating aspects of operations that may be performed at a provider network to balance supply and demand for different categories of power sources by transferring workloads from one data center to another, according to at least some embodiments. As shown in element 801, for each of several data centers at a multi-data-center provider network, a respective power supply mix metric applicable for some time period (e.g., a forthcoming three-month period) may be determined. The supply mix metric for a given data center may indicate, for example, how much power from renewable energy sources is to be delivered during the time period, and how much power from non-renewable energy sources is to be delivered. An analysis of contractual agreements may be used to determine the supply mix metric, for example, or the supply mix metric may be obtained by querying the suppliers programmatically.

A corresponding demand mix metric may be generated for each of the data centers (element 804), for at least a part of the time period. For example, if the supply mix is applicable for a three month period, a respective demand mix may be generated for each week, or each day, or even each hour in some implementations. The demand mix metric may indicate, for example, an estimate of aggregate demand at a given data center for power from renewable energy sources and from non-renewable energy sources, and may be derived from current trends in power supply category preferences indicated by clients. In some cases, the time periods applicable for the supply mix metric and the demand mix metric may be identical, but the demand mix may still differ from the supply mix because the supply was contractually agreed upon at some earlier point in time.

As shown in element 807, the demand mix metrics and the supply mix metrics for various data centers may be analyzed in accordance with the power demand rebalancing policy, e.g., in an effort to determine if some mismatches exist that can be remedied by transferring some workload (e.g., some service units) from one data center to another. For example, it may be the case that with respect to renewable energy, datacenter A has a surplus supply, while datacenter B has a surplus demand during the same time period. In such a scenario, a decision to try to identify candidate service units that can be transferred across data centers (e.g., by using a different set of resources than were originally targeted for those service units) may be made. It is noted that, for a given pair of data centers being considered, a difference in either the demand mix metrics, the supply mix metrics, or both demand and supply mix metrics may lead to a decision to rebalance in various embodiments. In some cases, the pricing policies for different types of power source categories may also differ between data centers (e.g., some data centers may be located near cheap renewable energy sources), in which case costs may also have to be taken into account when implementing the rebalancing policy. The power demand rebalancing policy may, for example, specify a set of rules to be followed when determining whether rebalancing should be attempted (e.g., "for possible service unit transfers, only consider data centers that are located within X miles of each other") and/or how rebalancing should be implemented ("a transfer of a service unit should only be attempted if resources capable of handling the workload are available for at least X days at the destination").

If a decision to attempt rebalancing is made (as determined in element 810), e.g., by the rebalancing manager 222 of the resource manager 180, candidate service units for transition from one data center to another may be identified (element 813). Any of the service units for any of the different types of network-accessible services described above may be eligible for transfer in various embodiments. At the destination data center, resources at which the target service units can be implemented may be identified, and the resources may be configured accordingly (element 816). E.g., if a compute instance (a service unit of a virtualized computing service) is to be transferred, an appropriate virtualization host at which the compute instance can be implemented may be identified and configured at the destination data center. Whether rebalancing is to be attempted or not (as indicated by the "Yes" and "No" arrows emerging from element 810 respectively), in at least some embodiments the next time period(s) for which rebalancing analysis is to be attempted may be determined (element 819), and the operations corresponding to elements 801 onwards may be repeated for the next time period(s). It is noted that at least in some embodiments, similar types of power-source-based rebalancing analysis may be performed at a different granularity than data centers. E.g., in one embodiment, rebalancing may be attempted across subsets of data centers that have independent power supply infrastructures, and in another embodiment rebalancing may be attempted across geographical regions that each contain multiple data centers.

It is noted that in various embodiments, operations other than those illustrated in the flow diagrams of FIGS. 6, 7 and 8 may be implemented to support client-selectable power sources for provider network services, and that some of the operations shown may not be implemented, or may be implemented in a different order or in parallel rather than sequentially.

Use Cases

The techniques described above, of allowing clients to choose service units categorized by power source type, may become increasingly useful as more and more clients of provider networks adopt environment-friendly policies. The ability to compare costs associated with providing power from renewable and non-renewable sources at relatively fine granularity, such as at the compute instance level or the storage object level, may empower clients to make choices that are both financially and environmentally appropriate. The auditing capabilities described may also help to reassure clients that their power sourcing choices are actually being respected. Certifications indicating the extent of a client's use of renewable energy sources may help provider network clients attract favorable attention, and may help spur further migration to renewable energy sources.

Illustrative Computer System

Figure 9:
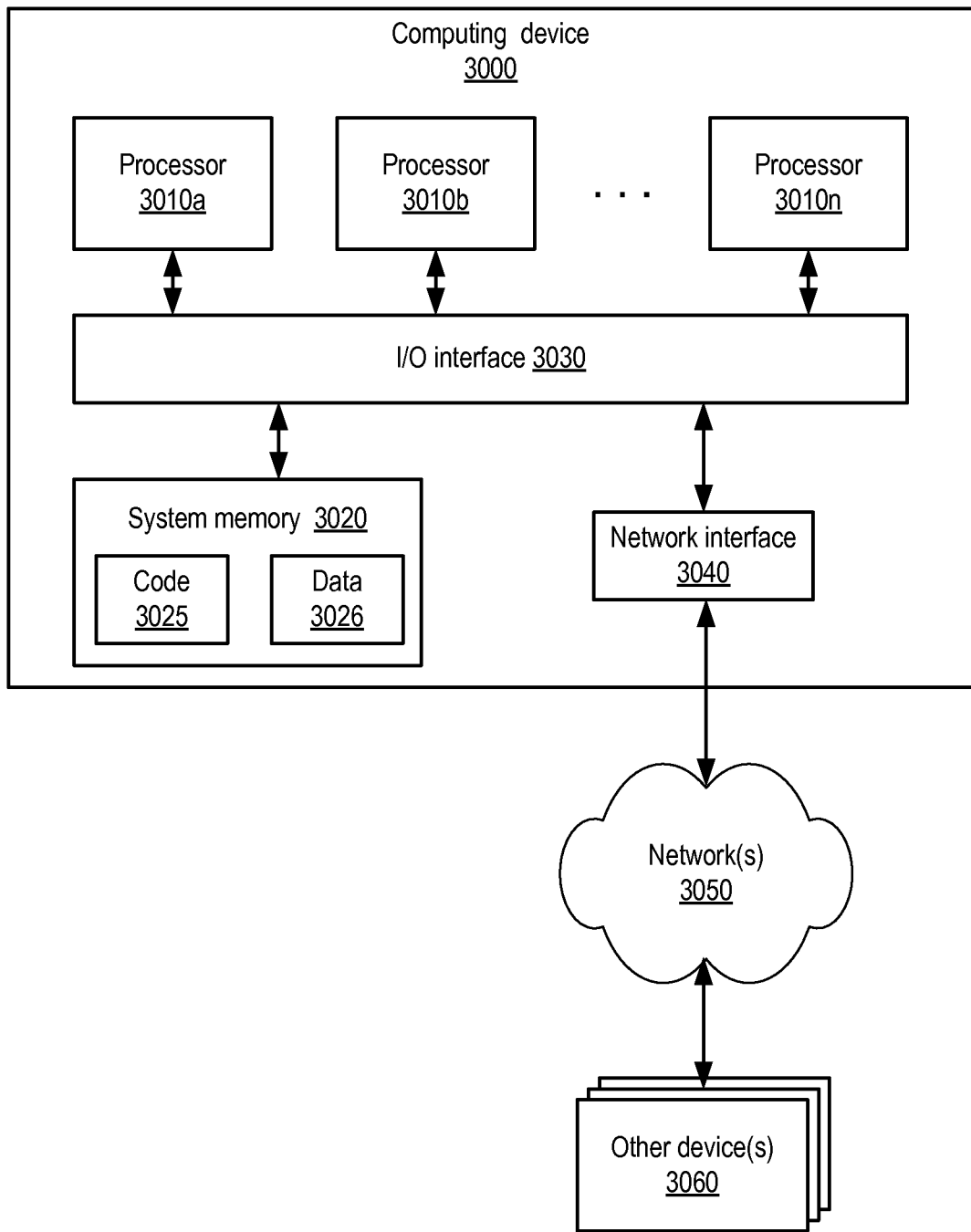
FIG. 9 is a block diagram illustrating an example computing device that may be used in at least some embodiments.

In at least some embodiments, a server that implements a portion or all of one or more of the technologies described herein, including the techniques to implement resource managers, metrics agents, DPMCs, and the like, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, by one or more computing devices of a provider network:
        determining, corresponding to each of at least a first data center and a second data center of the provider network, a respective power supply mix, indicative of an amount of electrical power estimated to be obtained from (a) renewable energy sources and (b) non-renewable energy sources respectively at the data center during a time period;
        generating, corresponding to each of at least the first data center and the second data center, a respective power demand mix, indicative of an estimated aggregate demand for electrical power to be obtained from (a) the renewable energy sources and (b) the non-renewable energy sources respectively during at least a portion of the time period;
        identifying, based at least in part on a power demand rebalancing policy and at least in part on an analysis of the power supply mix and the power demand mix of the first and second data centers, a service unit of a particular network-accessible service targeted for implementation at the first data center as a candidate for a transition to the second data center in order to rebalance an estimated mismatch between supply and demand for power obtained from renewable energy sources, wherein the power demand rebalancing policy specifies rebalancing of service units among data centers for a data center expected to experience a mismatch between supply and demand for power obtained from renewable energy sources;
        identifying one or more resources at the second data center that can implement the candidate service unit to be transitioned in order to at least partially rebalance the expected mismatch between supply and demand for power obtained from renewable energy sources; and
        directing transition of the identified service unit to the second data center, wherein directing transition causes the one or more resources at the second data center to implement the service unit such that the resources that implement the identified service unit at the second data center are powered via one or more renewable energy sources that at least partially rebalance the mismatch between supply and demand for power obtained from renewable energy sources.

2. The method as recited in claim 1, wherein the power supply mix metric of the first data center differs from the power supply mix metric of the second data center.

3. The method as recited in claim 1, wherein the power demand mix metric of the first data center differs from the power demand mix metric of the second data center.

4. The method as recited in claim 1, wherein said generating the respective power demand mix metric is based on analyzing a plurality of client requests for service units of the network-accessible service, wherein a client request of the plurality of client requests comprises a client preference for electrical power from a renewable energy source for a service unit indicated in the client request.

5. The method as recited in claim 1, wherein the network-accessible service comprises one of: (a) a virtual computing service, (b) a storage service, (c) a database service, (d) a search service, (e) a workflow service, (f) a messaging service, (g) an email service, (h) a security appliance service, (i) a transcoding service, (j) an identity management service, (k) an online marketplace service, or (l) a network configuration service.

6. The method as recited in claim 1, wherein the candidate service unit of the network-accessible service comprises one of: (a) a compute instance with a specified performance capability, (b) a storage object of a specified size, (c) a number of database transactions, (d) a specified number of bytes transferred via a network, or (e) a number of servers.

7. A system, comprising:
one or more computers configured to:
determine, corresponding to each of at least a first data center and a second data center, a respective power supply mix, indicative of an amount of electrical power estimated to be obtained from (a) renewable energy sources and (b) non-renewable energy sources respectively at the data center during a time period;
generate, corresponding to each of at least the first data center and the second data center, a respective power demand mix, indicative of an estimated aggregate demand for electrical power to be obtained from (a) the renewable energy sources and (b) the non-renewable energy sources respectively during at least a portion of the time period;
identify, based at least in part on a power demand rebalance policy and at least in part on an analysis of the power supply mix and the power demand mix of the first and second data centers, a service unit of a particular network-accessible service targeted for implementation at the first data center as a candidate for a transition to the second data center in order to rebalance an estimated mismatch between supply and demand for power obtained from renewable energy sources, wherein the power demand rebalance policy specifies rebalance of service units among data centers for a data center expected to experience a mismatch between supply and demand for power obtained from renewable energy sources;
identify one or more resources at the second data center that can implement the candidate service unit to be transitioned in order to at least partially rebalance the expected mismatch between supply and demand for power obtained from renewable energy sources; and
direct transition of the identified service unit to the second data center, wherein said direct transition causes the one or more resources at the second data center to implement the service unit such that the resources that implement the identified service unit at the second data center are powered via one or more renewable energy sources that at least partially rebalance the mismatch between supply and demand for power obtained from renewable energy sources.

8. The system of claim 7, wherein to determine, corresponding to each of at least the first data center and the second data center, the respective power supply mix, the one or more computers are further configured to determine a power supply mix metric of the first data center that differs from the power supply mix metric of the second data center.

9. The system of claim 7, wherein to generate, corresponding to each of at least the first data center and the second data center, the respective power demand mix, the one or more computers are further configured to generate a power demand mix metric of the first data center that differs from the power demand mix metric of the second data center.

10. The system of claim 7,
wherein to perform said generate the respective power demand mix metric the one or more computers are further configured to analyze a plurality of client requests for service units of the network-accessible service, and wherein a client request of the plurality of client requests comprises a client preference for electrical power from a renewable energy source for a service unit indicated in the client request.

11. The system of claim 7, wherein the network-accessible service comprises one of: (a) a virtual computing service, (b) a storage service, (c) a database service, (d) a search service, (e) a workflow service, (f) a messaging service, (g) an email service, (h) a security appliance service, (i) a transcoding service, (j) an identity management service, (k) an online marketplace service, or (l) a network configuration service.

12. The system of claim 7, wherein the candidate service unit of the network-accessible service comprises one of: (a) a compute instance with a specified performance capability, (b) a storage object of a specified size, (c) a number of database transactions, (d) a specified number of bytes transferred via a network, or (e) a number of servers.

13. The system of claim 7, wherein:
the first data center and the second data center each have independent power supply infrastructures, or
the first data center and the second data center are each in distinct geographical regions that each contain multiple data centers.

14. One or more non-transitory computer readable media storing program instructions executable on or across one or more processors to implement a resource manager configured to perform:
determining, corresponding to each of at least a first data center and a second data center, a respective power supply mix, indicative of an amount of electrical power estimated to be obtained from (a) renewable energy sources and (b) non-renewable energy sources respectively at the data center during a time period;
generating, corresponding to each of at least the first data center and the second data center, a respective power demand mix, indicative of an estimated aggregate demand for electrical power to be obtained from (a) the renewable energy sources and (b) the non-renewable energy sources respectively during at least a portion of the time period;
identifying, based at least in part on a power demand rebalancing policy and at least in part on an analysis of the power supply mix and the power demand mix of the first and second data centers, a service unit of a particular network-accessible service targeted for implementation at the first data center as a candidate for a transition to the second data center in order to rebalance an estimated mismatch between supply and demand for power obtained from renewable energy sources, wherein the power demand rebalancing policy specifies rebalancing of service units among data centers for a data center expected to experience a mismatch between supply and demand for power obtained from renewable energy sources;
identifying one or more resources at the second data center that can implement the candidate service unit to be transitioned in order to at least partially rebalance the expected mismatch between supply and demand for power obtained from renewable energy sources; and directing transition of the identified service unit to the second data center, wherein directing transition causes the one or more resources at the second data center to implement the service unit such that the resources that implement the identified service unit at the second data center are powered via one or more renewable energy sources that at least partially rebalance the mismatch between supply and demand for power obtained from renewable energy sources.

15. The one or more non-transitory computer readable media of claim 14, wherein said determining, corresponding to each of at least the first data center and the second data center, the respective power supply mix comprises determining a power supply mix for the first data center that differs from a determined power supply mix for the second data center.

16. The one or more non-transitory computer readable media of claim 14, wherein said generating, corresponding to each of at least the first data center and the second data center, the respective power demand mix comprises generating a power demand mix metric of the first data center that differs from a generated power demand mix metric of the second data center.

17. The one or more non-transitory computer readable media of claim 14, wherein said generating the respective power demand mix metric includes analyzing a plurality of client requests for service units of the network-accessible service, and wherein a client request of the plurality of client requests comprises a client preference for electrical power from a renewable energy source for a service unit indicated in the client request.

18. The one or more non-transitory computer readable media of claim 14, wherein the network-accessible service comprises one of: (a) a virtual computing service, (b) a storage service, (c) a database service, (d) a search service, (e) a workflow service, (f) a messaging service, (g) an email service, (h) a security appliance service, (i) a transcoding service, (j) an identity management service, (k) an online marketplace service, or (l) a network configuration service.

19. The one or more non-transitory computer readable media of claim 14, wherein the candidate service unit of the network-accessible service comprises one of: (a) a compute instance with a specified performance capability, (b) a storage object of a specified size, (c) a number of database transactions, (d) a specified number of bytes transferred via a network, or (e) a number of servers.

20. The one or more non-transitory computer readable media of claim 14, wherein the resource manager is further configured to perform:

determining a next time period for a next rebalancing of the service units among the data centers; and determining, for the next period of time, not to attempt rebalancing based at least in part on:

the power demand rebalancing policy, a power supply mix for the first and second data centers for the next period of time, and a power demand mix of the first and second data centers for the next period of time.

\* \* \* \* \*